United States Patent
Gordin et al.

(10) Patent No.: US 9,402,292 B1
(45) Date of Patent: Jul. 26, 2016

(54) PROVIDING, MEASURING AND DEMONSTRATING HIGHLY EFFECTIVE UPLIGHTING

(71) Applicant: MUSCO CORPORATION, Oskaloosa, IA (US)

(72) Inventors: Myron Gordin, Oskaloosa, IA (US); David L. Barker, Ottumwa, IA (US); Lawrence H. Boxler, Columbus, IN (US); Lance K. Livingston, Arvada, CO (US)

(73) Assignee: Musco Corporation, Oskaloosa, IA (US)

( * ) Notice: Subject to any disclaimer, the term of this patent is extended or adjusted under 35 U.S.C. 154(b) by 9 days.

(21) Appl. No.: 14/328,455

(22) Filed: Jul. 10, 2014

Related U.S. Application Data

(60) Provisional application No. 61/844,697, filed on Jul. 10, 2013.

(51) Int. Cl.
　　*H05B 37/02* (2006.01)
　　*H05B 33/08* (2006.01)
　　*G01J 1/42* (2006.01)

(52) U.S. Cl.
　　CPC ............ *H05B 33/0872* (2013.01); *G01J 1/42* (2013.01)

(58) Field of Classification Search
　　CPC ........................................................ H05B 37/02
　　USPC ....................... 315/291, 307, 308, 312, 185 R
　　See application file for complete search history.

(56) References Cited

U.S. PATENT DOCUMENTS

| | | | |
|---|---|---|---|
| 6,132,044 A | 10/2000 | Sternbergh | |
| 6,631,987 B2 | 10/2003 | Reichow et al. | |
| 6,893,127 B2 | 5/2005 | Reichow et al. | |
| 7,479,622 B2* | 1/2009 | May | F21K 9/54 250/205 |
| 2002/0048169 A1* | 4/2002 | Dowling | H05B 33/0857 362/234 |
| 2006/0203483 A1* | 9/2006 | Rains, Jr. | F21S 2/00 362/231 |
| 2012/0206050 A1* | 8/2012 | Spero | B60Q 1/04 315/152 |

FOREIGN PATENT DOCUMENTS

EP　　2290432　　3/2011

OTHER PUBLICATIONS

Gordin, Myron, et al., Pending U.S. Appl. No. 12/939,838, filed Nov. 4, 2010.

(Continued)

*Primary Examiner* — Minh D A
(74) *Attorney, Agent, or Firm* — McKee, Voorhees & Sease, PLC

(57) ABSTRACT

A method, system, or apparatus for evaluating and/or improving illumination of a wide area target area or space above the same. Illumination of the area or space is evaluated relative to conventional illumination levels and spectral features. At least a portion of illumination is adjusted in some aspect of spectral profile to improve contrast between a target in the space or aspects of the target area or space. The adjusted illumination can be uplight, downlight, or both. Optionally, an object is launched to a known height above a lighting location, and the luminance from the object is read by a calibrated sensor, enabling verification of adequate uplighting.

24 Claims, 13 Drawing Sheets

(56) References Cited

OTHER PUBLICATIONS

Valero, Eva M., et al., "Recovering Spectral Data from Natural Scenes with an RGB Digital Camera and Colored Filters", found at http://online.uminho.pt/pessoas/smcn/smcn%20reprints/Colour%20Research%20and%20Application/CRA%20Eva,%20Nieves,%20Nascimento,%20Amano%20e%20Foster%202007.pdf, and incorporated by reference herein Color Research and Application, vol. 32, Issue 5, pp. 352-360 (ISSN 1520-6378) 2007.

Hiscocks, Peter D., "Measuring Luminance with a Digital Camera", available at http://www.ee.ryerson.ca/~phiscock/astronomy/light-pollution/luminance-notes.pdf (downloaded from the internet on Jul. 2, 2014 and incorporated by reference herein), Sep. 16, 2011.

Gabeleb, Helke, et al., "The Usage of Digital Cameras as Luminance Meters", available at http://www.image-engeineering.de/library/conference_papers/luminance_meters.pdf (downloaded from the internet Jul. 2, 2014 and incorporated by reference herein).

Meyer, Jason E., et al., "Development and Validation of a Luminance Camera", available at http://scholar.lib.vt.edu/VTTI/reports/Luminance_Camera_021109.pdf, Feb. 11, 2009.

* cited by examiner

PROVIDING, MEASURING AND DEMONSTRATING HIGHLY EFFECTIVE UPLIGHTING

CROSS-REFERENCE TO RELATED APPLICATIONS

This application claims priority under 35 U.S.C. §119/35 U.S.C. §120 to provisional U.S. application Ser. No. 61/844,697, filed Jul. 10, 2013, hereby incorporated by reference in its entirety.

I. BACKGROUND OF INVENTION

1. Field of Invention

Some embodiments of the present invention generally relate to lighting systems. More specifically, some embodiments of the present invention relate to LED and other solid-state lighting fixtures and devices.

2. Background

In many sports, such as baseball, football, and golf, sometimes the ball will be high in the air, requiring good illumination in order for players and spectators to be able to see the ball. This is not a problem for daylight play. Neither is it too hard for night-time play using conventional lighting luminaires using e.g. HID light sources such as 10, FIG. 1. Conventional luminaires tend to spill a lot of light (i.e., emit light in a direction not specifically aimed at the field), sufficient to provide uplighting in area 50, high above the ground. Thus there has been very little need to design lights for uplighting, or to verify that sufficient uplighting has been made available. However, with advances in lighting control, and especially with the increasing popularity of LEDs for sports lighting, the amount of spill light is continually being reduced. The result is that the amount of light available in area 50 may be significantly reduced.

This means that there is now a significant concern in the industry to design for uplighting, both in terms of amount of light provided and in terms of other characteristics such as spectral power distribution of the uplighting. There is therefore also a need to be able to verify that the lighting installations as built meet the design specifications. And there is still further a need to be able to verify that the uplighting that is provided is of sufficient quality to meet the needs for play.

While changes from conventional lighting have raised concerns for uplighting, at the same time, the limitations of conventional lighting with regards to their spectral power distribution (SPD) have long been recognized. Although it is known that changing the SPD of light can sometimes improve contrast for sports objects, grass on the field, etc., it typically is not feasible to try to adjust SPD. But with the increasing use of LED lighting, there is an opportunity for varying SPD of downlighting and uplighting by LED luminaire design and operation techniques. This means that there is now an opportunity, with verification of lighting quality, to verify and optimize SPD of LED lighting systems for specific purposes.

There is yet even further a need to verify the quality of uplighting in a timely fashion. Since remedying such a problem is very difficult and time consuming, it is very important to determine uplighting quality prior to actual use for games, rather than simply waiting for players to discover that uplighting is not sufficient.

Additionally, it is necessary to provide the purchasers of a lighting system adequate assurance that the lighting performance they are purchasing is actually being provided. This assurance may be provided either visually or by means of measurement. Both are important, since some customers will only be satisfied by what their own eyes can see, while other customers will not be satisfied unless they receive a scientific report of lighting levels.

There is, therefore, room for improvement in the art.

II. SUMMARY OF THE INVENTION

Aspects of the invention improve on the state of the art.

In particular, aspects provide unexpected combinations of benefits, such as enhancing playability in sports with fast moving balls by, e.g., reducing the amount of a prominent color provided to a field, in order to expand the visual range of contrast.

Aspects of the invention use various techniques to verify the amount of uplight in the area high above the ground.

Further aspects of the invention provide an apparatus, system, and method for optimizing the visual effectiveness by both measuring existing uplight and/or changing characteristics of uplight provided to the area high above the ground for illuminating a ball in the air.

Further aspects of the invention provide an apparatus, system, and method for evaluating the effectiveness of uplighting by using ground-based equipment to launch an object to a predetermined height and measure its luminance.

In one embodiment according to aspects of the invention, a technique of or apparatus for of elevating a ball, reflector, or light measuring instrument in a specified X, Y, Z position relative a playing field is provided. This provides a way to verify uplighting levels in any desired portion of the area high above the ground, either visually or by accurate measurement.

Various techniques of or apparatus for elevating objects are envisioned, such as, e.g., using a tethered helium balloon, a small remote control helicopter, an extendible light weight pole, a suspension arrangement between existing poles on a playing field, or projectile launching.

Further aspects of the invention provide LED lighting with different color or color temperatures for downlighting and for uplighting.

Further aspects of the invention include a method, system, or apparatus for measuring uplight on sports fields comprising positioning an object (e.g. a baseball) at a known height and position above a field, capturing video or still photographs of the object, determining luminance of the object from the video or photographs, and thereby determining uplighting performance above a target area.

An embodiment comprises using a projectile launcher to launch an object (e.g. a baseball) at a known trajectory or to a known height, for the purpose of capturing video or still photographs of the object, determining luminance of the object from the video or photographs, and thereby determining uplighting performance above a target area. One example of an embodiment of this type is used at a baseball field to determine uplight levels. A mechanism for launching a ball is installed at or near home plate, and fired at a known vector under ambient conditions requiring uplighting. The baseball's trajectory will put the ball at its apogee above a predetermined minimum height. This minimum height is height which, if satisfactorily illuminated, should indicate that any height a ball in play will reach will have adequate illumination. Of course different sports, different levels of play, and other considerations will need to be considered when establishing this height. The trajectory of the ball is known given the launching parameters and simple physics. A camera is set up at a known location relative to the ball launcher which could, e.g., replicate a likely location from which a player would observe the ball. This location would be similar to an observer (e.g. player) tracking the flight of the baseball. The camera is oriented at a pre-determined angle that will capture the ball's trajectory at its apogee. The camera can be set to record video or otherwise such that multiple frames are captured. A processor analyzes individual frames within the video or frames to determine the approximate luminance of the ball, based on predetermined camera settings. This luminance value is useful for determining if the uplighting at a particular location, such as but not limited to a sports field, meets a desired standard, e.g. a design specification from a lighting manufacturer, or a design standard adopted by an industry or governmental organization.

III. BRIEF DESCRIPTION OF THE DRAWINGS

Figure 6A:
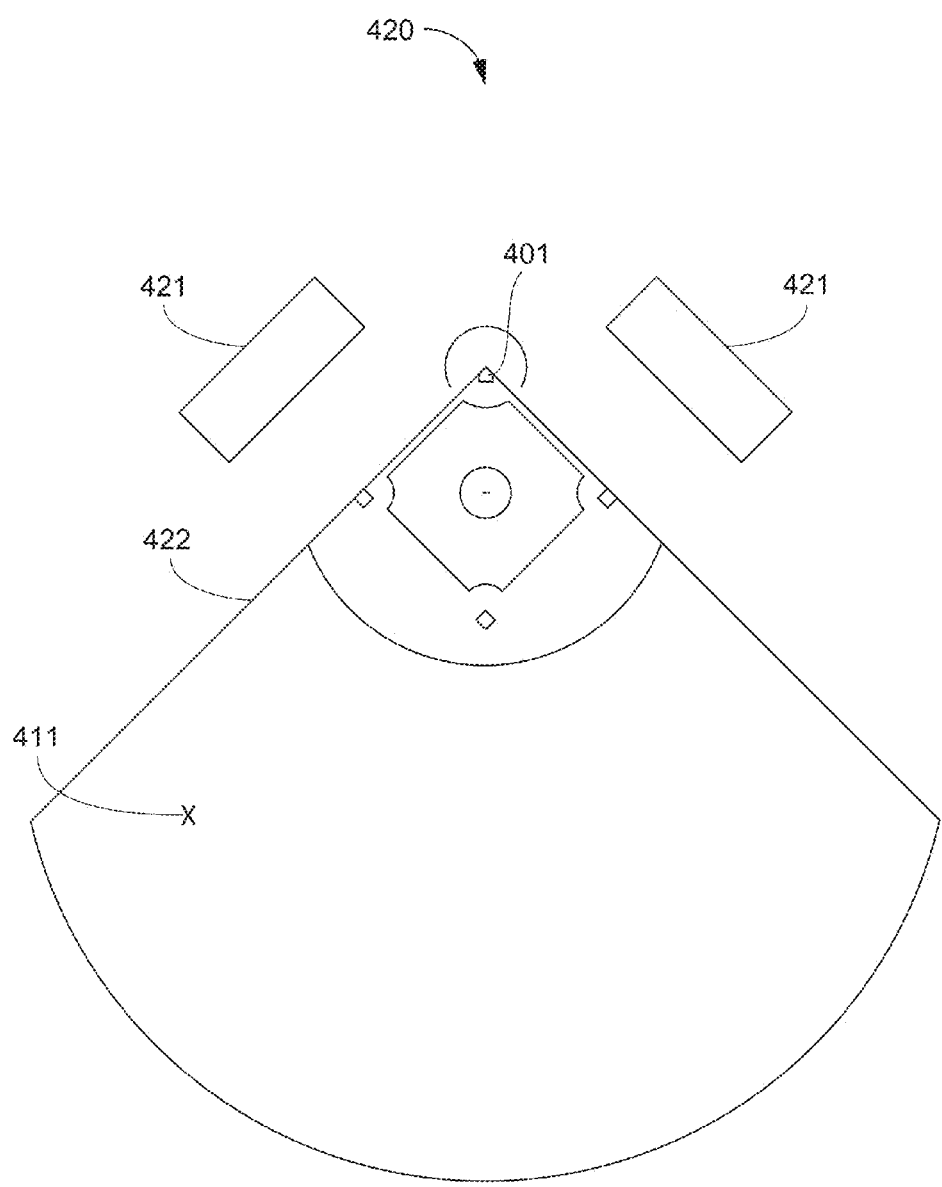
Figure 6B:
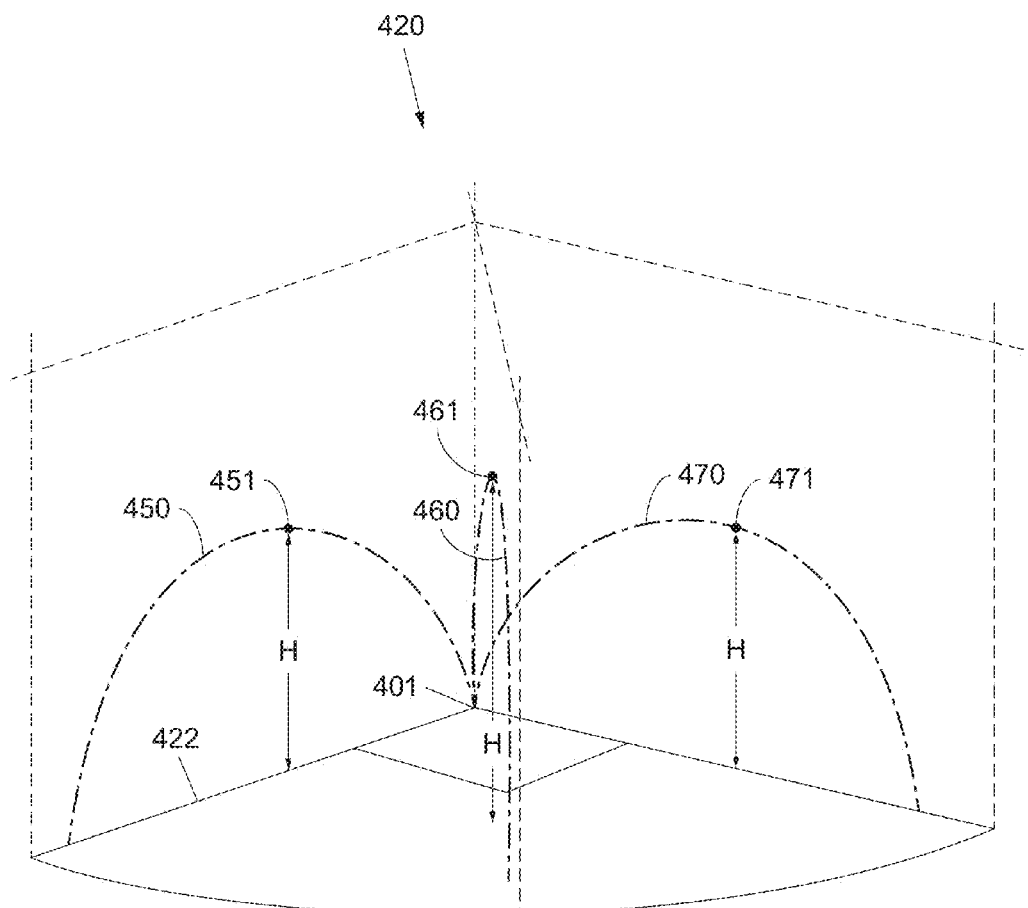

FIGS. 6A-B illustrate sports fields diagrammatically (top plan view at FIG. 6A; perspective view at FIG. 6B).

Figure 7A:
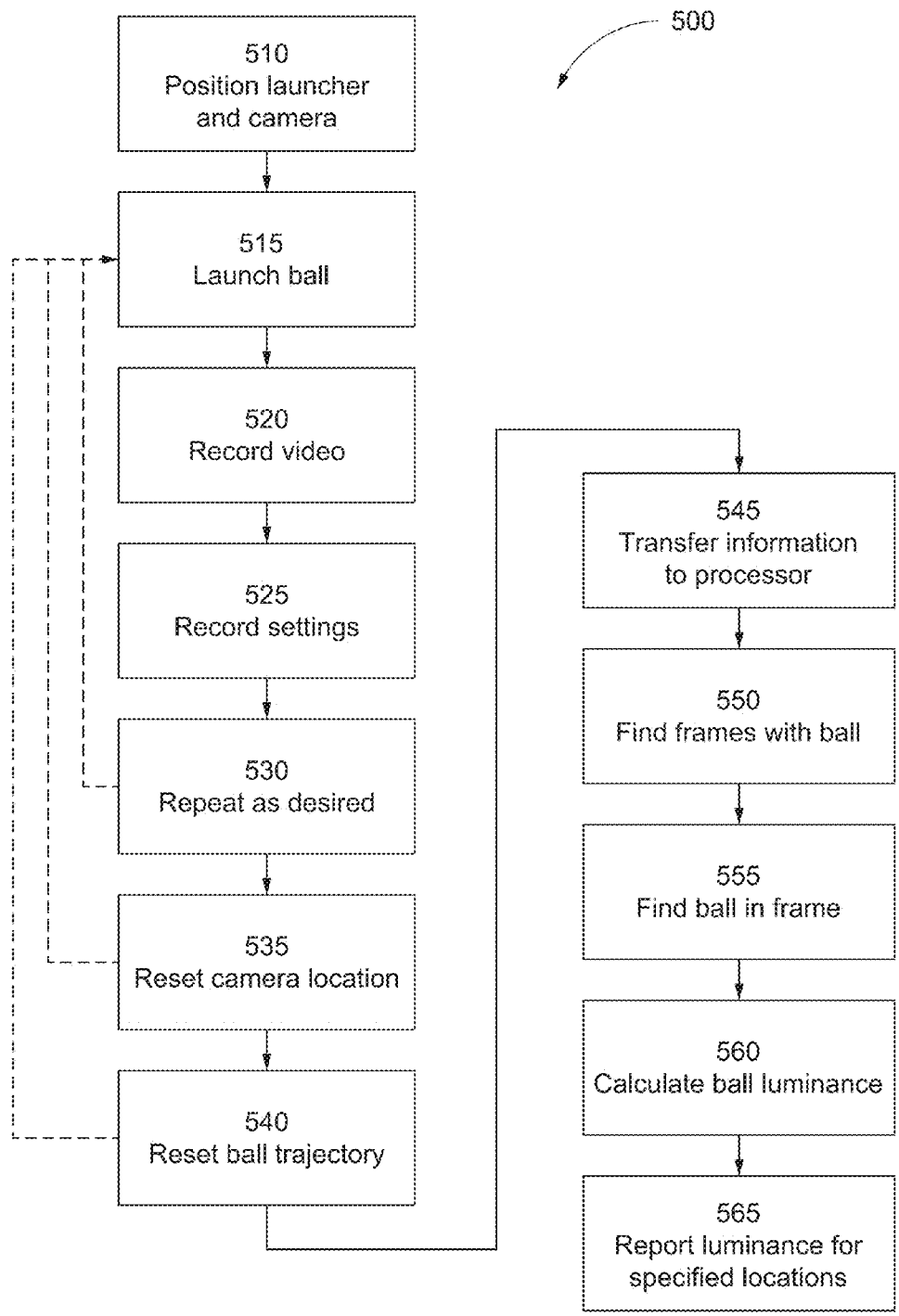
Figure 7B:
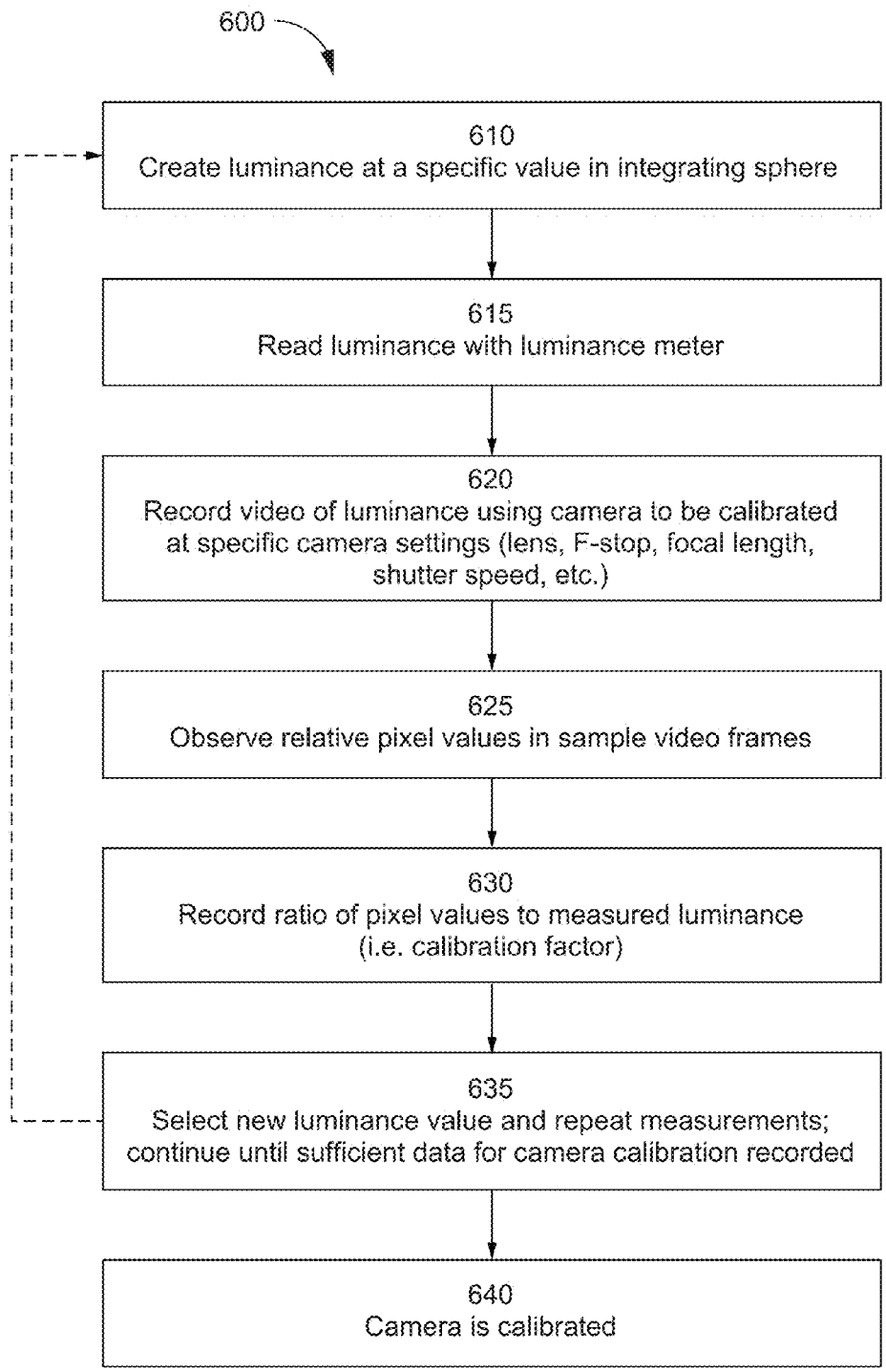

FIGS. 7A-B are flow charts further describing methods according to aspects of the invention.

FIGS. 8A-E illustrate components of an apparatus according to aspects of the invention.

IV. DETAILED DESCRIPTION OF EXEMPLARY EMBODIMENTS OF THE INVENTION

Background

Figure 1:
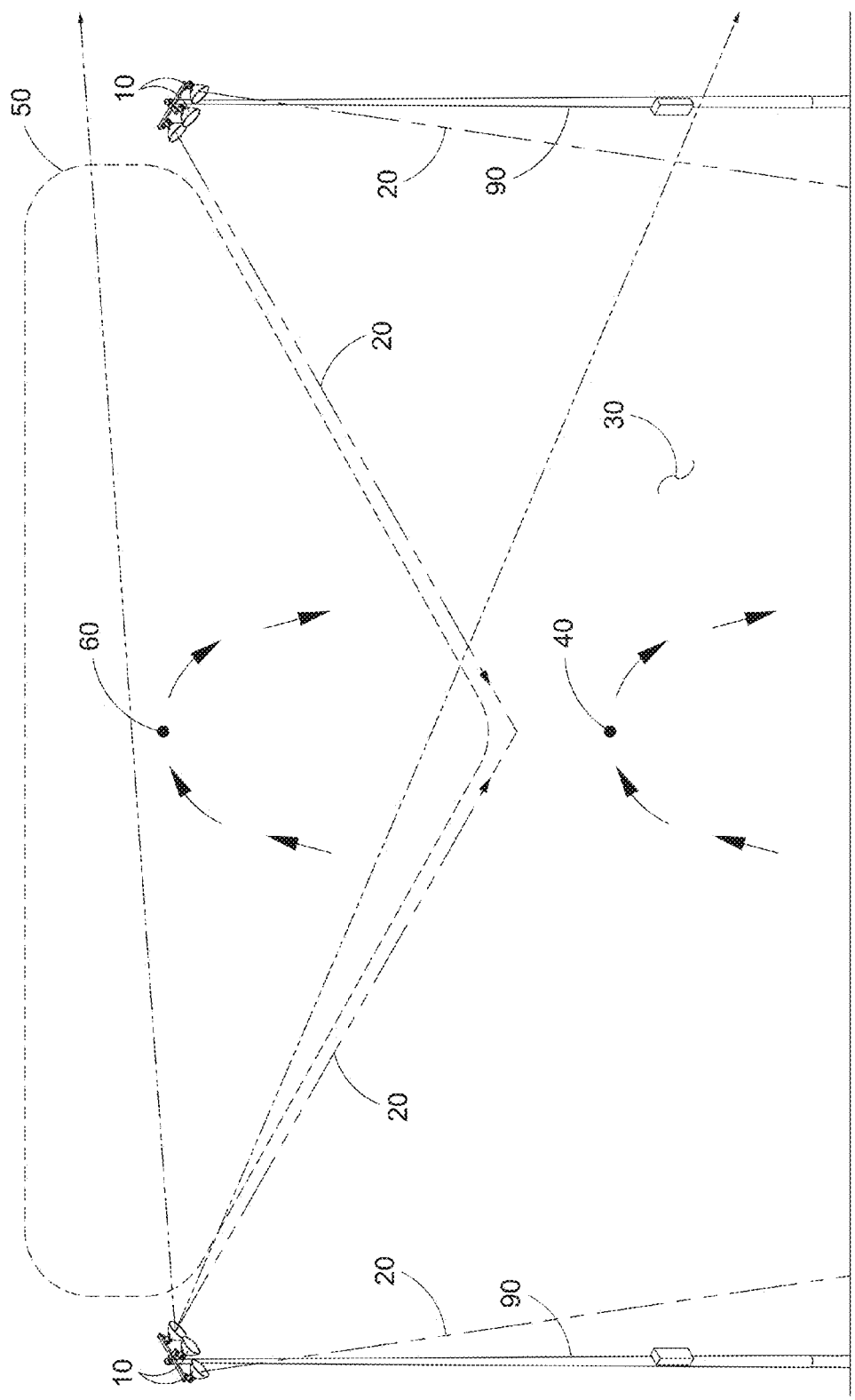
FIG. 1 illustrates a typical sports field diagrammatically from side elevation.
Figure 2:
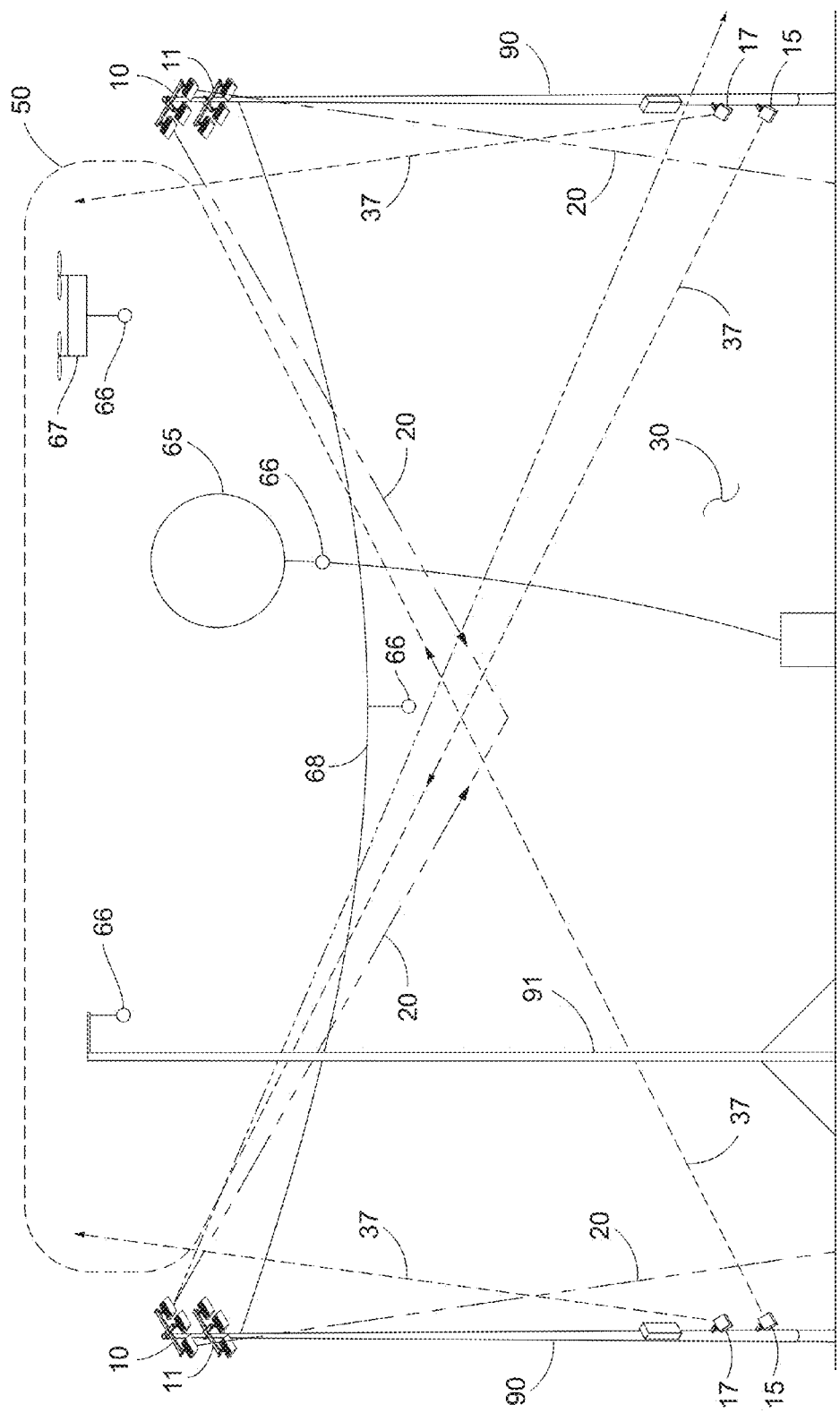
FIG. 2 illustrates a typical sports field with apparatuses according to aspects of the invention diagrammatically from side elevation.

FIG. 1 illustrates a typical sports field. The area 30 (the two-dimensional area of the field and the three-dimensional volume of space above it) is illuminated by fixtures 10 which are mounted on poles 90, and distinguished by representative rays 20 (which generally outline the cross-sectional vertical outer margins of illumination (down lighting) from fixtures 10). A ball 40 in play in area 30 is illuminated by the downlighting from fixtures 10. Area 50 is the upper area/space above the field where a ball 60 can be in play above area 30, and where, in accordance with aspects of the invention, additional uplighting may be provided. FIG. 2 illustrates embodiments of the invention as envisioned. For example, fixtures 15 may provide additional uplight, indicated by exemplary rays 37 (which generally outline the cross-sectional vertical outer margins of illumination from fixtures 15). Fixtures 11 may provide additional downlighting that is distinct in some way from fixtures 10. Fixtures 17 may provide additional uplighting of a type that is distinct in some way from fixtures 15.

Embodiment—Location-Specific or Target-Specific Variable Spectral Distribution Light Provision In one embodiment according to aspects of the invention, lighting, which may be general, downlighting, or uplighting, is provided which specifically enhances the visibility of the ball in play. It might be assumed that providing lighting with a spectral power distribution (SPD) that matches the reflective characteristics of a ball is best for visibility, since it would seem that greater reflectivity of an object and/or its background would seem likely to be more visually distinctive. However, counterintuitively it has been discovered that in some cases, it is better to provide a particular SPD of wavelengths that will optimize contrast of the ball with the background, and that will provide visual clues to the ball's speed and position by subtle shading that would be washed out by a more intense illumination at the wavelengths to which the ball or its background is most responsive. As discussed below, the lighting designer skilled in the art can utilize techniques to empirically or mathematically determine the SPD of wavelengths and optimization.

Sternbergh (U.S. Pat. No. 6,132,044) (incorporated by reference herein) and Reichow and Beaverton (EP 2 290 432, U.S. Pat. No. 6,631,987, and U.S. Pat. No. 6,893,127) (incorporated by reference herein) have discussed the concept of filtering wavelengths in order to decrease color saturation of key colors and thereby enhance differentiation in, for example, a golf course. A golf course has predominantly green color which tends to overwhelm the eye; actually filtering out green light tends to improve contrast between subtle shades of green. This can enhance a player's ability to discern changes in the course which would affect his or her playing strategy, such as being able to see a subtle tilt in the surface of a putting green that would be obscured without the increased differentiation of light shades. This has been commercialized by providing players with glasses that selectively filter different wavelengths. However, this requires the purchase of these special glasses by anyone wishing to obtain their benefits. Envisioned therefore is a method that analyzes spectral reflection areas and objects of interest, e.g. a football, baseball, softball, golf ball, etc. or a playing field such as a baseball infield or outfield, a football field, golf course, etc.; calculates an optimum wavelength distribution, and adjusts LED or other lighting to increase certain wavelengths and decrease others in order to provide better visibility for a ball in flight or on or near the specific playing field or area. This provides benefits such as making the ball contrast more with its surroundings or making a field or course easier to read for some aspect of playability. Additionally, in contrast with the methodology previously described in the issued patents incorporated by reference, these benefits are available to all observers and do not require the use of special glasses by players or spectators. The skilled in the art person can determine and/or calculate the wavelength distribution for the particular application.

Figure 3:
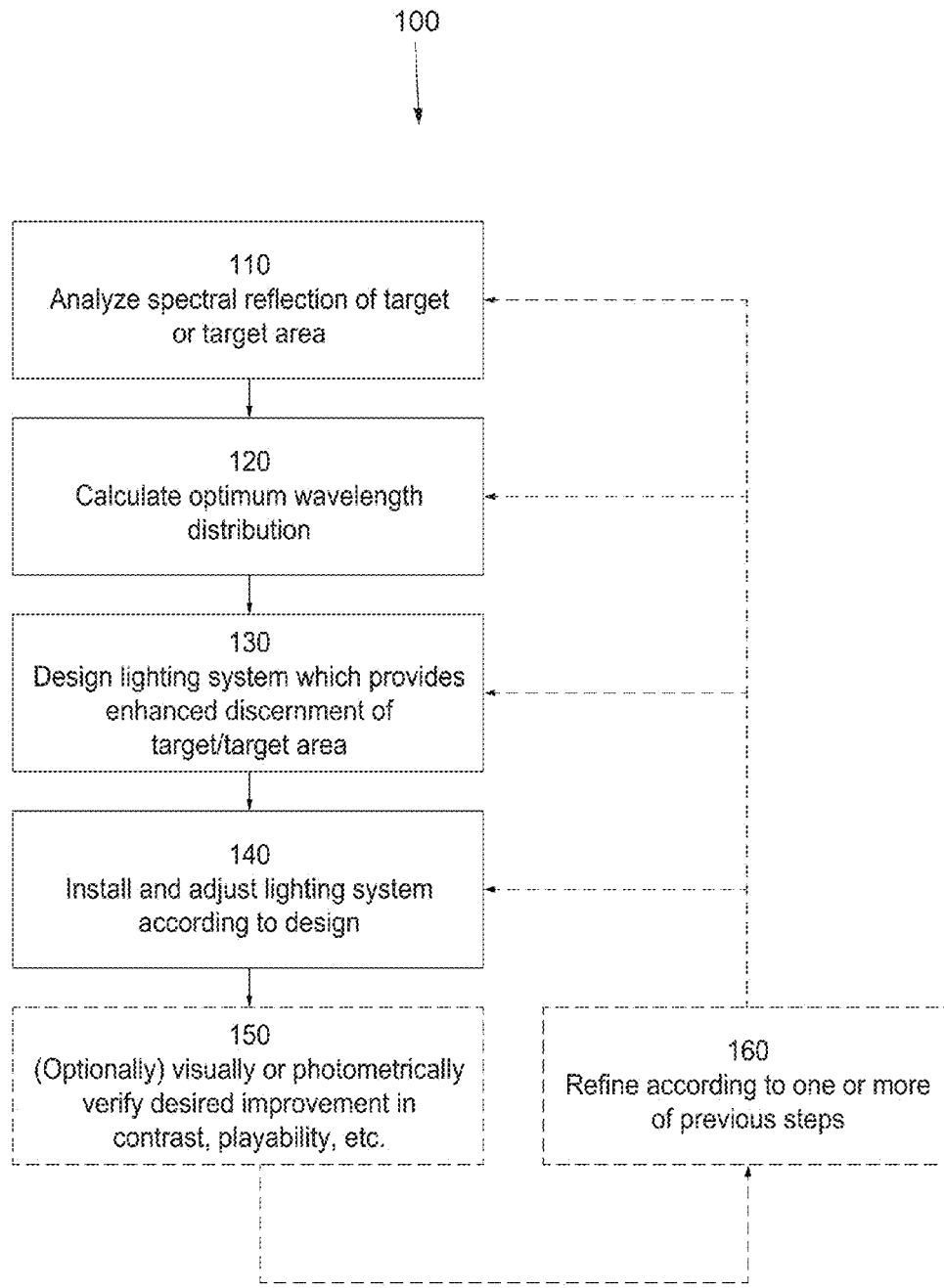
FIGS. 3-5 are flow charts describing methods according to aspects of the invention.

The flowchart 100 illustrated in FIG. 3 illustrates a method 100 envisioned according to aspects of the invention. First, the spectral reflection of the target object or target area is analyzed, step 110. The target can be, e.g., a ball. The target area can be, e.g., a sports field (and space above it) relevant to the ball. Then optimum wavelength distribution is selected in order to provide greatest contrast for the target object or target area, step 120. In order to select optimum wavelength distribution, data for the types of target and target area will need to be gathered in order to determine the range and fine variations of wavelengths suitable to the target area, and this information encoded into the processing software. Then optimum wavelength distribution can be accomplished by comparing readings with pre-recorded data. Next, a lighting system is designed which provides enhanced discernment of the target object or target area, step 130. Those skilled in the art are familiar with lighting system design and can utilize the principles herein in such design. Next, a lighting system is built and installed which provides the desired wavelength distribution, step 140. Those skilled in the art can take a lighting design and assemble and install the necessary fixtures for the plan. Optionally, the desired improvement in contrast, playability, etc. is verified visually or photometrically, step 150, resulting in either acceptance of the system as designed, or refinement, step 160, according to one or more of the proceeding steps. Those skilled in the art can accomplish these steps.

Examples of practice of the steps of method 100 are as follows:

Step 110 could entail use of a sensor or device that collects reflected light just from a target or target area. Such instruments are commercially available. One example of a meter that provides spectral information is the Mightex Compact CCD Spectrometer Model HRS-VIS-21 025 available from Mightex Systems, 2343 Brimley Road, Suite 868, Toronto, Ontario M1S22 3L6, Canada. The results would provide the user with information about the type of light reflected, including but not limited to spectral make-up, color, or color temperature. The amount of detail and specificity can be determined by the worker. In other words, a handful of different spectral bands or regions could be measured. They could be relatively wide. Or quite narrow bands or regions could be measured. This would be regulated by any number of factors including practicality (e.g. time and benefit of more specifics as opposed to less), the particular application involved, and the like. As can be appreciated, the data collected can be displayed, stored, or downloaded to another device. The data can be communicated to other devices. Other sensors or devices are of course possible.

Step 120 could entail evaluating the results of step 110 relative to the background of the object, and using known or empirically-derived information to identify possible wavelength distribution profiles that would be predicted or estimated to produce at least an improved contrast between a target (like a ball) or target area (like the grass of a field) and the background if the object was illuminated with such wavelength distribution light. Reichow and Beaverton (EP 2 290 432, U.S. Pat. No. 6,631,987, and U.S. Pat. No. 6,893,127) illustrate methods of evaluating targets and target areas for spectral reflectance, as well as proposed spectral transmittance for lenses to enhance viewing. Wavelength distribution profiles according to Step 120 could be determined similarly, however the distribution profiles would be implemented by modifying light emittance from LED sources rather than by modifying a lens worn by a player or spectator. This has the added benefit of providing enhanced visibility without requiring players or spectators to wear any special equipment. The ability to adjust color or color temperature of LED lights is discussed at co-owned, co-pending U.S. Ser. No. 61/911,259 (incorporated by reference herein) and U.S. Ser. No. 61/994,473 (incorporated by reference herein), and co-owned, co-pending U.S. Ser. No. 14/093,990 (incorporated by reference herein), where 61/911,259 discusses simpler adjustments to RGB distribution of color inputs, and 61/994,473 discusses actually varying distribution of different wavelengths for specific benefits in contrast etc. These are incorporated by reference herein.

Step 130 could entail selecting lighting components, placement, and operating parameters that would produce a desired wavelength distribution of light to the target(s) or target area(s). As mentioned, some solid state sources can be driven differently. Or different solid state sources are manufactured to have different spectral output distributions. Also, a possible advantage of solid state sources such as LEDs is that many are needed to illuminate wide area target areas such as sports fields. Thus for method 100, it is possible to select or drive each LED or group of LEDs in a specified way. This can allow LEDs in the same fixture to have different spectral outputs and/or different LEDs in the same or different fixtures to have a wide variety of spectral outputs which collectively can produce a desired overall spectral output profile for better target or target area contrast. Electrical power can be varied to LEDs or fixtures can contain sources of different outputs that can be switched on and others switched off, or intensity varied to alter a mixture of light outputs for different composite outputs. Or dedicated fixtures such as 11, 15 or 17, FIG. 2 could be installed additionally.

Step 140 could entail installing the selected lighting components according to the design plan of step 130 near the actual site of the target area(s). Again, the designer could specify different LEDs in each fixture (or different driving or operation) to produce a standard illumination spectral profile for illumination of the target area (such as the sports field) which would ordinarily in the state of the art also be used for uplighting. But in this embodiment of the invention, other LEDs in each fixture could be used to produce the higher contrast illumination of method 100. Or certain fixtures could produce the normal illumination and other fixtures the higher contrast illumination.

Step 150 could entail operating the installed lighting system and either viewing its operation or measuring its operation (via light meters, spectrometers, or the like). The former can allow the designer, the installer, the customer, or users of the field to view and visually confirm improved performance, or decide to alter or adjust the design as needed or desired. The latter can provide objective data to any of the above-listed persons for similar purposes. They could be done together. As indicated at step 160, this allows adjustment to preference or otherwise after installation.

Method 100 thus goes in a different direction than might be expected. Instead of trying to match the illumination spectral profile with lighting that provides the highest reflectivity from a target or target area, an analysis of the spectral profile of reflection of light from the target(s) or target area(s) based on normal illumination of the field is obtained. But dedicated lighting fixtures (e.g. 11 or 17, FIG. 2) or a subset of light sources in each fixture (e.g. fixtures 10 or 15, FIG. 2) are operated at a different spectral profile correlated to creating improved contrast with a given background (as possibly opposed to creating highest reflectivity, as previously discussed in light of the work of Sternbergh and Beaverton). This operation is either (a) by operating individual selected light sources all at a different output profile, or (b) by operating different light sources at different output profiles. Through this operation, improved visibility or other visual attributes can be achieved. One example of such improved visibility is that improved contrast can be obtained between a dark sky background and a white baseball flying through a dark night sky. Another example is an improved contrast can be obtained between different areas along a golf course (different areas of different shades of green).

If higher contrast is desired just for objects/targets in area 50 of FIGS. 1 and 2, dedicated higher contrast fixtures 17, of FIG. 2 could be specified for the same and aimed to area 50 while all other fixtures in normal illumination mode are aimed to cover field or area 30 in FIGS. 1 and 2. These dedicated higher contrast fixtures essentially produce special uplighting for higher contrast.

But if higher contrast of area 30 is needed, all fixtures 10 (and 11, if used) could be adjusted according to method 100.

Embodiment Comprising Variable Spectral Distribution Light Provision with Conditional Variability In one embodiment according to aspects of the invention as envisioned, lighting, which may be general, downlighting or uplighting, is provided which changes its spectral distribution in accordance with time (e.g. automatic adjustment at sunset), ambient conditions, or other variable factors. One example of such other variable factors is the use of different balls having different spectral reflectance characteristics. Another example is different background colors of natural turf in extremely wet or dry conditions (e.g. where the turf is a lush green due to favorable growing conditions, or a parched brown due to lack of moisture). Yet another example is the physical changing of artificial turf from one shade to another either due to fading, etc. or due to actually replacing existing artificial turf with new artificial turf which could vary in shade or even color.

Since color temperature of ambient lighting can change dramatically due to several factors, lighting which counteracts effects that would tend to obscure a ball in play or which would tend to make field or course conditions difficult to read is envisioned. An example of changing color temperature of ambient light is the conditions typically experienced at twilight. Light from the sun tends to move towards a lower "reddish" color temperature due to the effect of atmospheric interference. Therefore, it may be beneficial to provide lighting which provides a high contrast for a target object such as a baseball or golf ball. Higher color temperature lighting (additional shorter wavelengths) can be added to cause the target object to exhibit more contrast to the player or viewer. The optimum mix of color could change dramatically over a few minutes during the transition from daylight to twilight to full darkness. As twilight begins, field lighting could be turned on with a preset standard spectral distribution. As the sun continues to set, more shorter wavelengths could be added, or longer wavelengths subtracted continually, until a point is reached after sunset when full field lights are required and any ambient light, such as moonlight, tends to have a much higher color temperature. Thus the lighting provided would begin at the preset standard, change to blue/high color temperature, and then return to standard, red enhanced, or an optimal distribution according to the previously discussed embodiment, all over the period of e.g. 20 to 40 minutes. The transition time might need to be optimized based on local conditions, where length of twilight is influenced by latitude, or where mountainous terrain can make transition from daylight to dark conditions more abrupt than plains locations. This method would also be applicable to changes in lighting caused by highly overcast conditions, atmospheric dust, etc. in addition to the normal changes experienced at twilight.

As can be appreciated by those skilled in the art, information or knowledge about local conditions can be obtained from a variety of sources or empirically. For example, there could be structures or geography that shades a field to decrease direct or other ambient light. There could be a pattern of weather that affects ambient light etc.

Figure 4:
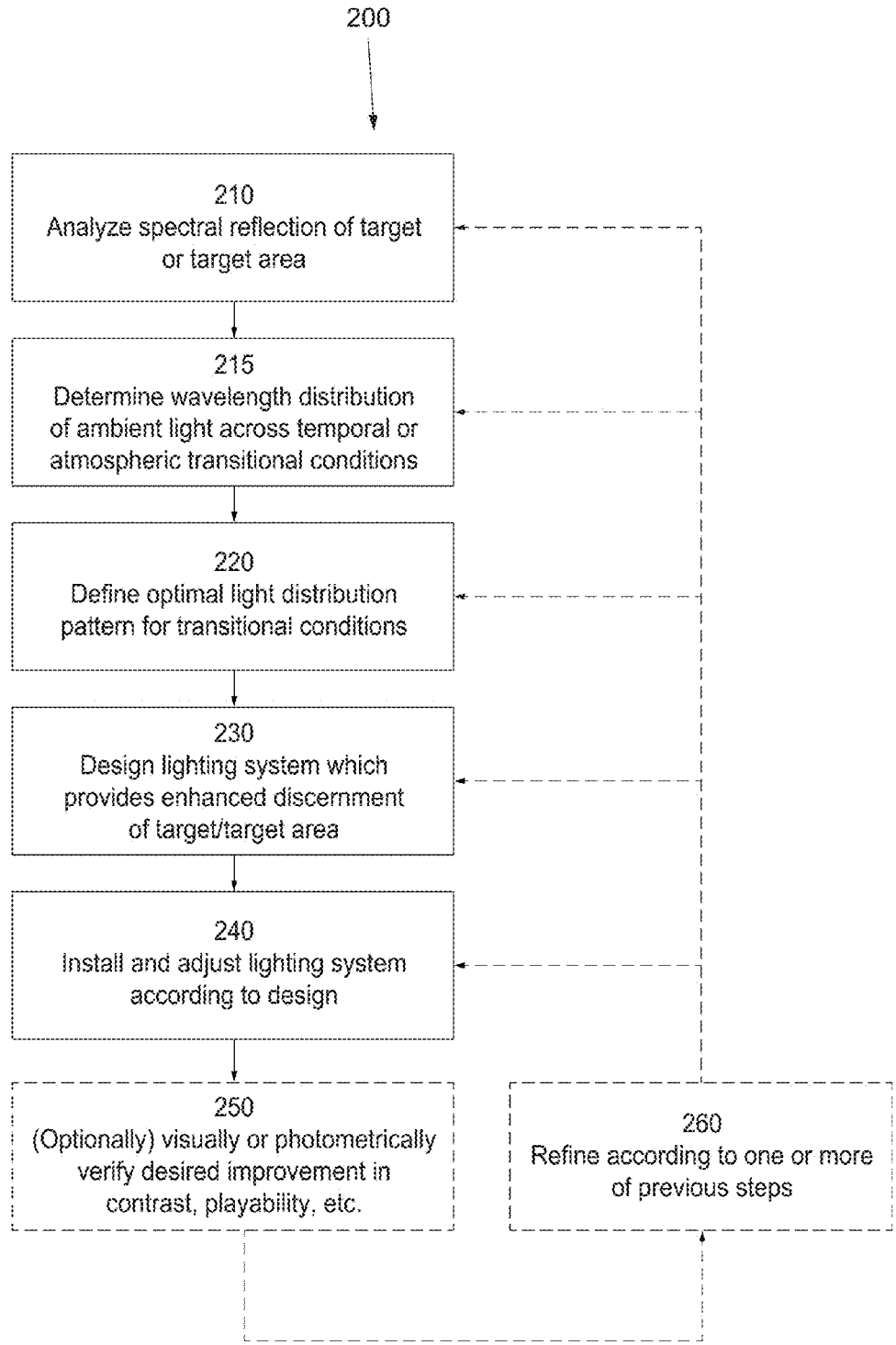

The flowchart 200 illustrated in FIG. 4 illustrates a method envisioned according to aspects of the invention. First, the spectral reflection of the target object or target area is analyzed, step 210. Such analysis can be by a number of ways known to those skilled in the art. Next, the range of ambient light over a known transitional time period or across various atmospheric conditions is determined, step 215. This determination can be done in a variety of ways. Then optimum wavelength distribution is determined in order to provide greatest visibility for the target object or target area during the entire transitional period, step 220. This determination can be accomplished in a variety of ways including those described elsewhere herein. Next, a lighting system is designed which provides enhanced discernment of the target object or target area, step 230. Next, a lighting system is built and installed which provides the desired wavelength distribution, step 240. Optionally, the desired improvement in contrast, playability, etc. is verified visually or photometrically, step 250, resulting in either acceptance of the system as designed or refinement, step 260, according to one or more of the proceeding steps.

As with method 100, the steps of method 200 can include spectral analysis, gathering of information regarding ambient conditions, calculation or deriving of light output profile for at least a subset of illumination sources, and installation and operation according to that design. The results can be demonstrated or measured.

Embodiment Comprising Light Measurement in an Area High Above the Ground

Another embodiment comprises elevating a target or sensor into the area high above the ground 50, FIG. 1, of a sports field and verifying either visually or photometrically the quantity or spectral composition of uplight in order to determine if sufficient light of specific characteristics has been provided in the area high above the ground. The target can be one of many possible items such e.g. as an actual ball appropriate to the venue, such as a baseball, softball, golf ball, etc. Or it could be a standardized target such as e.g. a rectangle provides a known response or appearance at different light levels. One example of such a target is the SRT-50-050 Diffuse Reflectance Target, available from Labsphere, Inc., 231 Shaker St., North Sutton, N.H. 03260, USA. The sensor could be a light meter, such as the previously mentioned Mightex Compact CCD Spectrometer Model HRS-VIS-21 025. Or a sensor associated by some technique, such as wired, wireless or infrared communication, with a remote light meter or processing unit could be used. One example of a light meter with a wireless remote control is the Gigahertz-Optik BTS256-E WiFi—Mobile Light Meter available from Gigahertz-Optik, Inc., 5 Perry Way, Newburyport, Mass. 01950 USA. As can be appreciated, output from this device can be displayed and transposed into another device or it could be in some cases a digital output that can communicate directly to another device such as a computer.

Several methods of elevating a target or sensor 66 could be used. One method would be to use a helium balloon 65, FIG. 2, large enough to lift a target or sensor 66 (e.g. on the order of from a fraction of a pound to several pounds). The balloon could be tethered (e.g. to a weighted but portable base) and moved around the field so that the target was presented at several locations or X, Y, Z coordinates corresponding to possible locations of the ball in play. The X and Y positions on the field could be marked or determined by a GPS, etc., and the Z position (altitude) set by a known length of tether cord. Stabilizing cords could be used to help keep the X and Y position of the target or sensor within desired tolerances. Tethering could also help maintain Z position.

In order to determine the effectiveness of the lighting, the target could be positioned at desired coordinates during the desired conditions such as twilight or night time. The target would be analyzed either by visual perception or by taking light meter or spectral analysis readings off the target. Such devices and methods are known in the art and commercially available. One example of such a meter is the HandHeld 2 Portable Spectroradiometer available from ASDI (Panalytical), of 2555 55th Street, Suite 100, Boulder, Colo. 80301, USA. Alternatively, light meter readings could be taken either by directly elevating and orienting the light meter or by elevating a light sensor which is used by a light meter to determine light levels. This process would be repeated for as many X, Y, Z coordinates desired in order to verify that light levels were sufficient, or to verify that the lighting scheme was providing the desired playability or visual contrast. This could then be used to either directly satisfy a customer by direct demonstration the direct viewing by the customer can provide real perception of actual conditions, or else to satisfy the customer by analysis and reporting from recorded light meter readings. It could even involve putting objects in play relative the target area to demonstrate effectiveness. On the other hand, data, graphic illustrations, or other reporting can be shown to a customer.

The target or sensor 66 could also be elevated on a portable, adjustable tower 91, FIG. 2, positioned at desired X, Y location(s) on the field and elevated to desired Z position (altitude). Or a remote controlled helicopter 67 equipped with GPS for X, Y, Z positioning could be used to elevate target or sensor 66. Or a cord 68 between existing poles or structures could be used to lift and locate a target or sensor 66, provided that a satisfactory number of location coordinates could be attained by this method.

Figure 5:
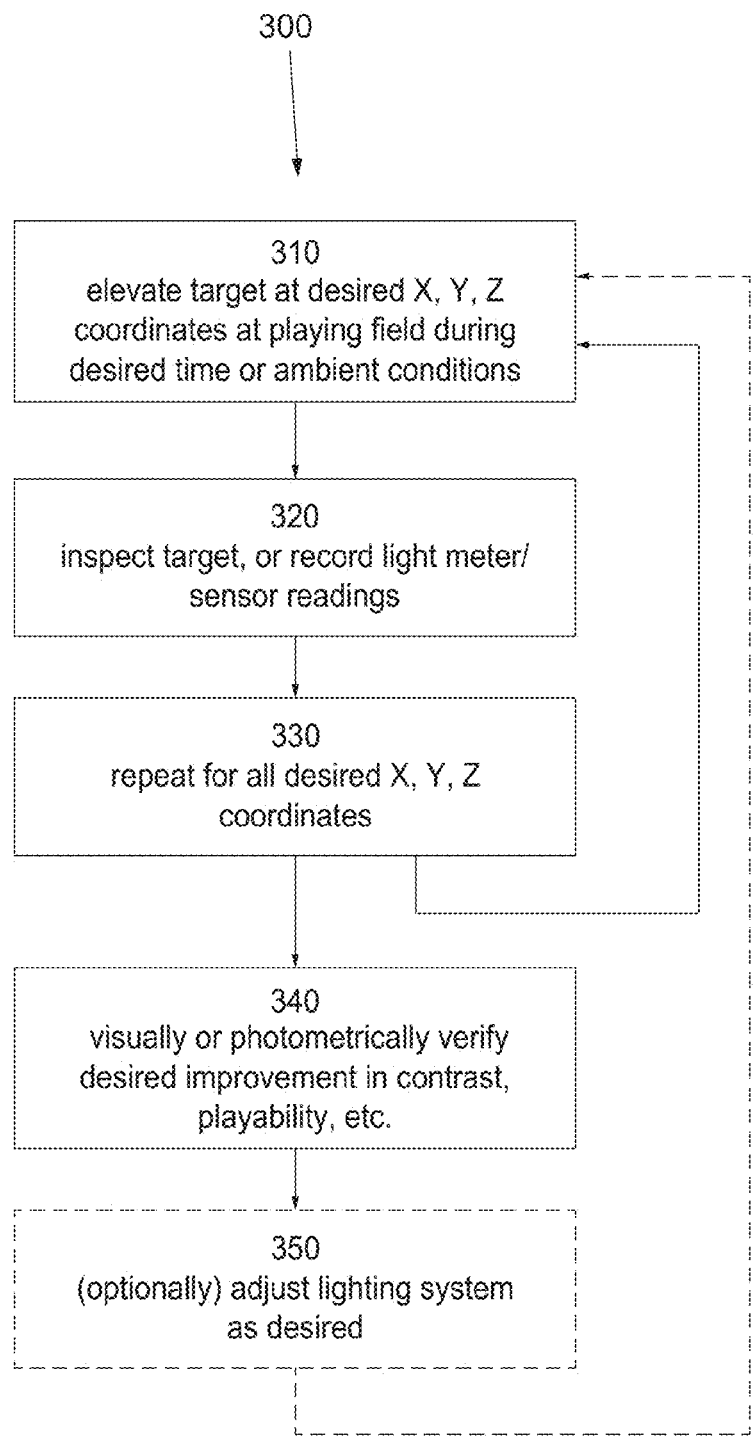

The flowchart 300 illustrated in FIG. 5 illustrates a method envisioned according to aspects of the invention. First, a target or sensor 66 is elevated at desired X, Y, Z coordinates at the field or course, step 310, under desired conditions, such as at night time or during twilight. Next, the target is visually inspected or readings are recorded from it by a light meter, spectrometer, or other sensor, step 320. Data from a sensor 66 could be communicated by wired or wireless link to a receiver at ground level, or the sensor 66 remotely controlled by wired or wireless link from the ground to capture the measurements. This is repeated for all desired X, Y, Z coordinates, step 330. The result is that the desired improvement in contrast or playability, spectral distribution, etc. is either verified, step 340, or optionally the lighting system is adjusted as desired, step 350, and the process is repeated.

Embodiment—Camera Measurement of Ball Luminance as a Measurement of Uplight

Figure 8A:
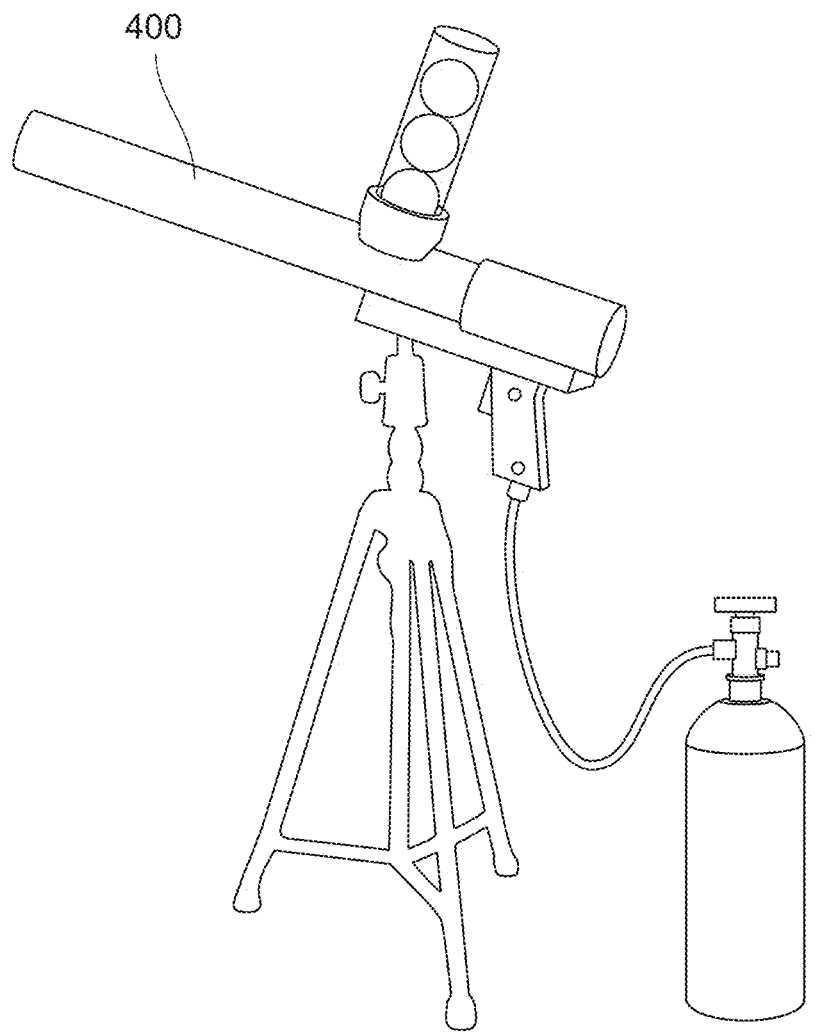
Figure 8B:
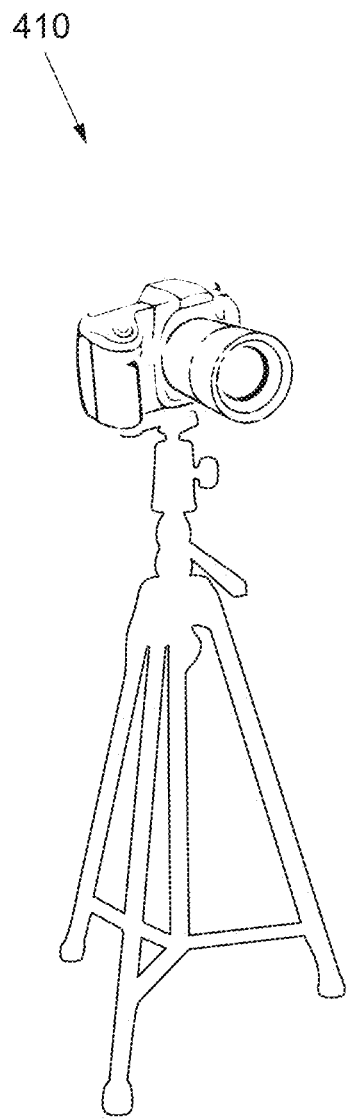
Figure 8C:
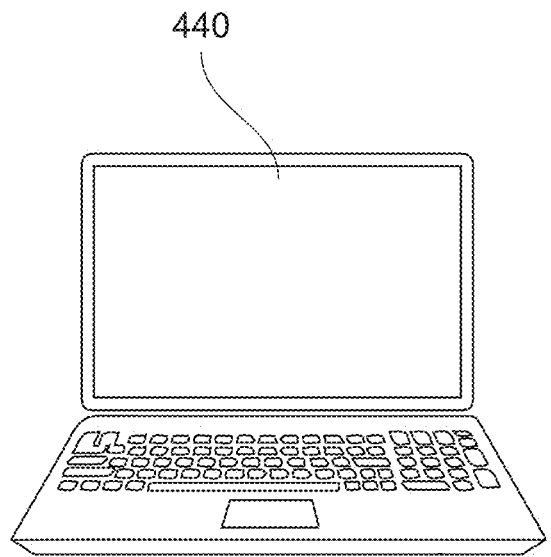
Figure 8D:
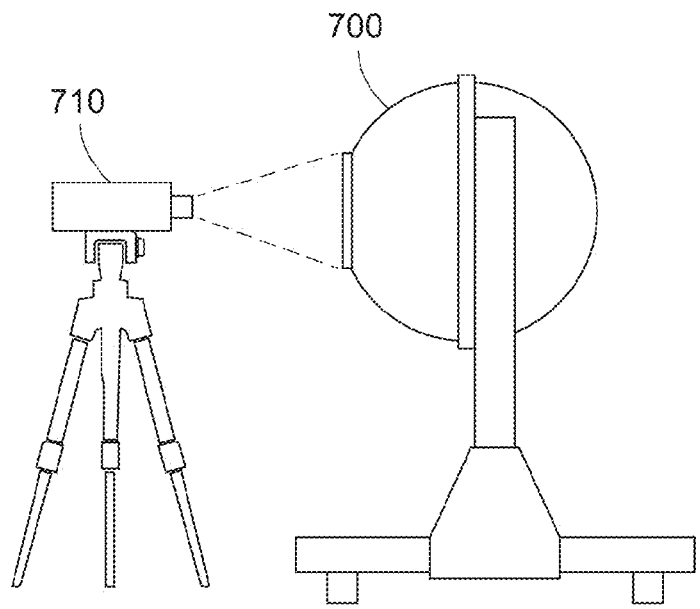
Figure 8E:
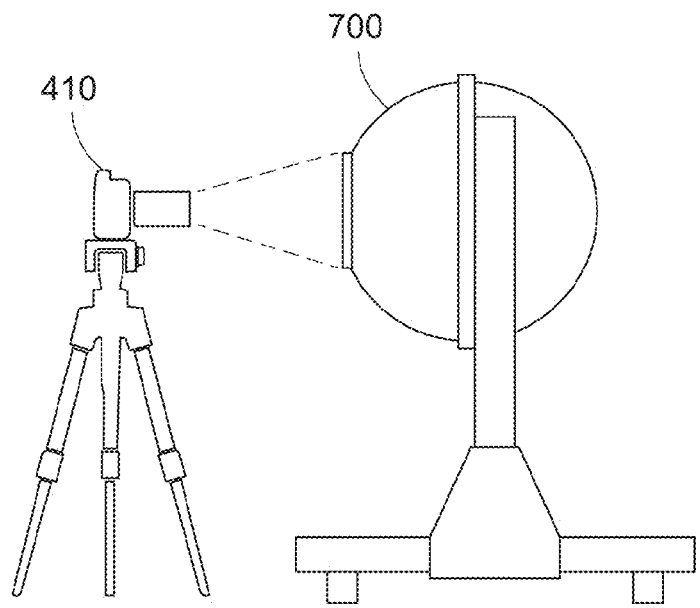

In a simplified embodiment according to aspects of the invention, ball launcher 400, FIG. 8A is installed at location 401, FIG. 6A, e.g. at or near home plate at baseball field 420. Camera 410, FIG. 8B is set up in right field at location 411, designated by 'x' in FIG. 6A. Camera 410 is aimed so that images will be recorded of a ball 451 at or near its apogee when launched in the vertical plane along the first base line 422 (see also FIG. 6B). The ball is then launched (e.g. by launcher 400) and camera 410 begins recording at approximately the same instant. With each ball launch, information which identifies ball launcher location and settings, and camera configuration must be recorded to be used in the analysis of data. This can be done by recording in e.g. a notebook, or automatically by any desirable method. The captured video is transferred to a processor 440, FIG. 8C, which analyzes the video frames, identifies ball location in the frames, and assigns a luminance value for each ball location. Ball luminance is determined using an appropriate algorithm which accounts for camera settings (including shutter speed, aperture, lens focal length and light transmissivity, etc.) and a pre-determined calibration factor specific to the current camera and lens combination. Note that the calibration of the camera is discussed below. The luminance value may then be compared with a desired specification, such as an industry or government standard, or a standard established by a lighting manufacturer, field owner, etc. Those skilled in the art are familiar with industry and government standards or lighting manufacture standards. They can get familiar with any specific requirements of the field owner or controller. A variety of software packages relate to lighting design and are commercially available. One example is DIALux software from DAIL GmbH, Bahnhofsallee 18 D-58507 Lüdenscheid, Germany.

Method 500, FIG. 7A, illustrates steps followed in this embodiment. Equipment 400 and 410 is positioned, step 510. A ball is launched, step 515. Camera 410 records video, step 520. Settings are recorded and correlated to the recorded video frames, step 525. Multiple videos of multiple ball launches are recorded as desired, step 530. See, e.g., FIG. 6B. Camera 411 location is changed as desired for a given ball trajectory, step 535. Ball trajectory is changed, step 540. See, e.g., FIG. 6B. Captured information (video and settings), is loaded to processing unit 440, step 545. Processor 440 finds frames with ball included, step 550. Location of ball in frame is calculated, step 555. Luminance of ball in frame is calculated, step 560. Target location illumination corresponding to ball luminance is reported for each specified location, step 565.

Ball launcher 400 of FIG. 8A may be similar to any of the "T-shirt cannons" sold by TSHIRTGUN.com at 3429-B Rutherford Rd. Ext, Taylors, S.C. USA 26987. One example is the "Saber" which is described at http://tshirtgun.com/sabre.html, and which is equipped with a tripod mount and multi-axis rotation. Of course, as previously discussed, the ball may be positioned above the field using other methods such as suspension from a cable or elevating structure, flying platform or drone, etc.

Camera 410, FIG. 8B, may be such as a Canon EOS Rebel T3I, available from Canon USA, Inc. Melville, N.Y. Camera 410 stores information on an "SD card" or other digital storage medium which is readable by PCs (e.g., can be directly removably interfaced with computer 440 and data from it read by computer 440). Other techniques of information transfer such as cable, Bluetooth® etc. may be used to move data from camera 410 to computer 440.

Software development would be according to principles known in the art, using the block diagrams included as FIGS. 7A and 7B as a methodological framework. Methods for retrieving pixel values are available using, e.g., the software development kit (SDK) available from Canon USA for the relevant Canon camera. One example of a method used to perform spectral measurements is found in Valero et al, "Recovering Spectral Data from Natural Scenes with an RGB Digital Camera and Colored Filters" found at http://online.uminho.pt/pessoas/smcn/smcn%20reprints/Colour %20Researh%20and %20A pplication/CRA%20Eva, %20Nieves,%20Nascimento,%20Amano %20e %20Foster %20200 7.pdf, and incorporated by reference herein.

Camera configuration and settings, such as lens focal length, f-number, filters, types of coatings, etc. can be varied, but must be accounted for by the software, since these settings will affect the amount of light admitted to the camera's sensor. The camera must also be configured in situ for appropriate sensitivity, since the apparent brightness value of the ball must be within the range of settings for the camera as configured and with given ambient and artificial light settings. This is easily done by those having skill in the art. For each combination of camera plus lens configuration, a calibration factor can be calculated based on analyzing a photograph, or still frame from video, of a known luminance captured by the camera. The known luminance can be determined, e.g., in a laboratory setting using an integrating sphere, via measurement using a previously calibrated camera, or via using a calibrated luminance meter.

The procedure for calibrating a camera for use as a luminance meter is well known in the art. A detailed study which outlines principles and procedures for such a calibration is "Measuring Luminance with a Digital Camera" by Peter D. Hiscocks, available at http://www.ee.ryerson.ca/~phiscock/astronomy/light-pollution/luminance-notes.pdf (downloaded from the internet on 7/2/14 and incorporated by reference herein). Another such study is "The usage of digital cameras as luminance meters" by Dietmar Wüller and Helke Gabeleb, available at http://www.image-engineering.de/library/conference papers/luminance meters.pdf (downloaded from the internet 7/2/14 and incorporated by reference herein). Still further, the paper "Development and Validation of a Luminance Camera" by Jason E. Meyer, Ronald B.

Gibbons, and Christopher J. Edwards, available at http://scholarlib.vt.edu/VTTI/reports/Luminance_Camera_021109.pdf provides a detailed guide to using cameras for luminance readings. The preceding papers (Hiscocks, Wüller, Meyer) are hereby incorporated by reference herein.

A simplified example of such a calibration procedure is illustrated in FIG. 7B, procedure 600. First, a specific luminance, e.g. 5 foot candles (fc) is created at the exit port of an integrating sphere 700, FIG. 8D-E, step 610. An example of an integrating sphere 700 available commercially to the art is the US-200-SF twenty inch diameter integrating sphere, with eight inch diameter sphere exit port, available from Labsphere, Inc., 231 Shaker St., North Sutton, N.H. 03260, USA. The luminance at the exit port of integrating sphere 700 is measured with a luminance meter 710, FIG. 8D such as a MAVOLUX 5032 C/B USB available from GOSSEN Foto- and Lichtmesstechnik GmbH, Nürnberg, Germany, step 615. The camera 410 to be calibrated, FIGS. 8B and 8E, records video of the luminance at the exit port of the integrating sphere, step 620. Camera 410 should be configured identically or close thereto to its configuration for use in the field, including the identical settings for ISO, shutter speed, file size, aperture, etc., and identical or close thereto equipment such as lens, filters, etc. as will be used for field measurements. The relative pixel values in the sample video frames are then observed and recorded, step 625. The ratio of recorded pixel value to measured luminance is calculated and recorded, thereby creating a calibration factor, step 630. A new luminance value is selected and created at the exit port of integrating sphere 700 and the process is repeated until sufficient data is recorded for camera calibration for the desired luminance range, step 635. When the process has been sufficiently repeated camera 410 is calibrated for use at the specified settings and configuration, step 640. This entire process may be repeated for different camera settings, different lenses, etc.

Multiple camera locations may be chosen, including other outfield locations, or within spectator sections e.g. 421, FIG. 6A, as desired, to ensure correction illumination values from any desired perspective.

TABLE 1

Table 1 below lists one set of configuration settings which could be used:

| | |
|---|---|
| Camera model | Canon EOS Rebel T3I |
| Lens model | EF-S 18-55 mm f/3.5-5.6 IS |
| F-stop | f/8 |
| Focal length | 55 mm |
| Video Frame rate | 30 fps |
| Shutter speed | 1/60 sec. |
| ISO | 500 |
| File size | 1920 × 1080 |

Note that this embodiment enables measuring luminance of a ball (i.e. amount of light reflected from the ball) in locations in the air, which locations correspond to an illuminance specification for a field (i.e. amount of light supplied to a given area or space in a given direction by the uplight sources). It should be noted that while an illuminance specification is commonly used for specifying how a field is to be satisfactorily illuminated, its purpose here is to enable actually seeing the ball with sufficient clarity to play at a satisfactory level. Thus specifying a luminance reading from a ball is one level removed from the specification, but it is a useful and valid measurement since it provides verification that the ball is actually visible and "playable" (and so is not actually conceptually removed from the desired outcome of the specification). So, while there are good reasons in the industry for specifying illuminance, still, using luminance of a known object with known optical properties and of the type that is used for sports play is also a good, and even perhaps better, measure of satisfactory light levels.

A sample (generic) specification for lighting at baseball fields, and which could be adapted for different requirements such as more or less skilled levels of play, broadcast or no broadcast of sporting events, etc. is as follows:

"SPECIFICATION: A baseball having specific reflectivity characteristics shall have its luminance measured above the field, at the maximum height for which uplighting is specified, in locations including (a) above the first base line, (b) above the line from home plate through second base, and (c) above the third base line. Luminance of the ball shall be sufficient for satisfactory play, and shall be at or above a minimum luminance value. Luminance of the ball shall be measured from eye level at least three locations in the field, including first, second, and third bases, and shall be from each measurement location measured for each specified aerial position. The minimum luminance value may be selected to correlate with accepted standards for uplight illumination. Luminance measurements shall be taken by a calibrated instrument with traceable calibration history, and shall be accurate within industry standards."

So for a specific location and standard for play, an exemplary specification is as follows:

"SPECIFICATION: Using a new (unused) Diamond brand Little League® baseball, model Diamond DSLL (available from Diamond, 1880 E. St Andrew Place, Santa Ana, Calif. 92705), the ball shall exhibit a minimum luminance reading of 15 cd/m^2 at a minimum height of 80 feet, as measured for each specified ball position from at least three locations, including (a), above the first base line; (b), above the line from home plate through second base; and (c), above the third base line. Measurements of luminance of the ball shall be from the field locations specified according to an X, Y, Z coordinate system with home plate as (0,0,0), the X axis along the first base line, Y axis along third base line, and Z axis vertical; with dimensions in feet. The positions where the luminance readings are to be taken are shown in Table 2 below. Luminance measurements shall be taken by a calibrated instrument with traceable calibration history, and shall be accurate within industry standards."

TABLE 2

| Location | X, Y, Z position (units feet) | Description |
|---|---|---|
| Launcher | (0, 0, 0) | Home Plate |
| Location 1 | (90, 0, 5) | eye level, player at 1st base |
| Location 2 | (90, 90, 5) | eye level, player at 2nd base |
| Location 3 | (0, 90, 5) | eye level, player at 3rd base |

FIG. 6B illustrates the information described by the above specification: the ball 451, 461, and 471 is observed from each specified location at an elevation H of 80 feet or higher above the field along paths 450, 460, and 470, on the three planes extending vertically along lines from home plate through first, second, and third bases respectively. Note further: 15 cd/m^2 corresponds to an illuminance of 7.0 foot-candles on the ball in the air, as could be measured by a photocell on the ball in the air in the specified paths, with said photocell pointed to the player position.

The above specification is exemplary for a given location; other specifications could be used, of course, to reflect higher or lower minimum height, more or less luminance from the ball, additional or fewer observation points, etc., according to field situation and needs and desires of the field owners, etc.

Options and Alternatives

The foregoing are but a few examples, neither inclusive nor exclusive, of forms the invention can take. Variations obvious to those skilled in the art are possible and included within the invention.

A variety of examples have been given throughout the above description. Another example could be that any of the methods or systems discussed could be varied according to need and desire by one skilled in the art utilizing the concepts discussed above. One setup to provide uplighting with LED sources is set forth in co-owned, copending U.S. Ser. No. 12/939,838, which is incorporated by reference herein. Of course, a variety others are possible.

What is claimed is:

1. A method for providing illuminating light for improved visibility or reflectivity of objects in a space having surrounding areas or space comprising:
   a. providing a lighting system including a plurality of light sources for providing illumination in the space;
   b. adjusting or setting spectral distribution from at least some of the light sources according to spectral reflectance characteristics of at least one of the objects and the spectral power distribution and luminance of a surrounding area or space to improve visibility or reflectivity of the object in contrast to the surrounding area or space.

2. The method according to claim 1 where spectral distribution is optimized according to changing ambient conditions and is varied over time.

3. The method according to claim 1 wherein the object comprises a target or sensor located in the space according one or more sets of physical space X, Y, Z coordinates, and one or more visual references or optical measurements are taken for reference or adjustment of the lighting system.

4. The method of claim 1 wherein the spectral distribution comprises uplighting, downlighting, or both.

5. The method of claim 1 wherein the spectral distribution is produced by plural LED sources having a desired output or operated to produce the desired output by one or more of:
   a. filtering out specified wavelengths;
   b. adding specified wavelengths;
   c. subtracting specified wavelengths;
   d. a combination of any of the above.

6. The method, system or apparatus of claim 1 wherein the spectral distribution is produced by plural LED sources that differ or are operated differently from each other.

7. A method for providing uplight optimized for visibility or reflectivity of an object within the uplighting comprising:
   a) measuring uplighting illumination with a conventional illumination of a target or a target area; and
   b) measuring spectral luminance of background of an object and adjusting or setting uplighting for better contrast of the object relative to background to the space than the conventional illumination based on the measurements.

8. The method of claim 7 wherein the measuring comprises spectral distribution and intensity of uplight for the conventional illumination and the adjusting is to a spectral distribution different therefrom.

9. The method of claim 8 wherein the adjusted illumination is with LEDs.

10. The method of claim 9 wherein the space is a target area illuminated with a wide area lighting system.

11. The method of claim 10 wherein the target area comprises a sports field.

12. The method of claim 7 wherein the adjustment of uplight comprises changing color or color temperature.

13. The method of claim 12 wherein the changing of color or color temperature comprises increasing and/or decreasing certain spectral wavelengths.

14. The method of claim 13 wherein the adjusted uplight is an optimized mixture of color or color temperature spectral wavelengths for best contrast with the object or background.

15. The method of claim 7 wherein the adjusted uplighting is temporary based on a factor comprising time, ambient conditions, or user-selection.

16. A method for measuring, demonstrating, or verifying uplight relative to an illuminated sports field comprising:
   a. positioning an object at a known trajectory or to a known height relative to the sports field;
   b. measuring a characteristic of the uplight relative the object; and
   d. evaluating uplighting performance relative to the illuminated sports field from the determination.

17. The method of claim 16 wherein the measuring comprises:
   a. capturing with a camera video or one or more still photographs of the object for one or more trajectories;
   b. determining luminance of the object from the video or the one or more photographs with a computer and computer program.

18. The method of claim 17 wherein the camera is a digital video and/or still camera and further comprising calibrating the camera by:
   a. creating luminance at a specific value in an integrating sphere;
   b. reading the luminance with a luminance meter;
   c. recording frames of video or photographs of the luminance using the camera at specific camera settings;
   d. observing relative pixel values in sample frames;
   e. recording a ratio of pixel values to measured luminance; and
   f. repeating the foregoing steps for a plurality of luminance values.

19. The method of claim 16 where the object comprises a sports object relevant to the sports field and is launched from a projectile launcher and moves relative the sports field.

20. The method of claim 16 wherein the object is sensor and the measuring comprises:
   a. sensing light at the sensor at one or more heights;
   b. determining a level or intensity of the sensed light.

21. The method of claim 20 wherein the sensor is suspended in the uplight by an elevating structure or an elevating device.

22. A system for measuring, demonstrating, or verifying uplight relative to an illuminated sports field comprising:
   a. a wide area lighting system including plural solid state light sources in each of plural luminaires positioned and aimed to provide illumination and uplight relative to the sport field;
   b. a launcher or an elevator adapted to either propel an object at a known trajectory or suspend an object to a known height relative to the sports field;
   b. a sensor adapted to measure a characteristic of the uplight relative the object; and
   d. a processor adapted for communication with the sensor and having programming to evaluate uplighting performance relative to the illuminated sports field from the sensor measurements.

23. The system of claim 22 wherein:
a. the object comprises a sports object relevant to the sports field;
b. the launcher is a projectile launcher effective for the sports object;
c. the sensor is a digital camera aimed to the trajectory of the launched sports object.

24. The system of claim 22 wherein:
a. the object comprises the sensor;
b. the elevator comprises an elevating structure or airborne device suspending the light sensor;
c. the sensor is a light meter.

\* \* \* \* \*